Fig. 1

United States Patent Office 3,084,049
Patented Apr. 2, 1963

3,084,049
PROCESS FOR THE PREPARATION OF A COCOA BUTTER SUBSTITUTE AS WELL AS FOR THE PREPARATION OF CHOCOLATE AND THE SHAPED PRODUCTS THUS OBTAINED
Yde A. Sinnema, Koog aan de Zaan, Netherlands, assignor to N. V. Twincon, Koog-Zaandijk, North Holland, Netherlands, a corporation of the Netherlands
Filed May 9, 1960, Ser. No. 27,848
Claims priority, application Netherlands May 13, 1959
11 Claims. (Cl. 99—118)

The invention relates to the preparation of a cocoa butter substitute which, apart from the taste, the smell, and the colour, is equal or almost equal to cocoa butter. The properties of this substitute are such that they fall, as desired, entirely or almost entirely within the limits of divergency of these properties for cocoa butter.

A mixture of the substitute according to the invention, in any proportion, with cocoa butter has properties which fall, as desired, entirely or almost entirely between those of the substitute and those of cocoa butter, which means that any quantity of the substitute can be added to cocoa butter, while the properties of the mixture invariably remain equal to those of cocoa butter.

Among naturally occurring fats cocoa butter occupies an exceptional place because it is solid and hard at room temperature, in consequence of which it is not fatty to the touch, while it melts readily and completely below body temperature. Owing to this melting behaviour, which is exceptionally short for fats, it melts readily in the mouth. It is due to these unusual properties that cocoa butter is eminently suitable for the preparation of chocolate. In view of this as well as the comparatively small production of cocoa butter it has always been expensive as compared with other fats. On this account cocoa butter has long been replaced completely or partly by cheaper fats, while attempts are constantly being made to improve the latter.

In the first instance naturally occurring fats, such as palm oil, palm kernel fat, Shea butter, Mowrah fat, Borneo tallow, were taken for this purpose. Among these fats, Borneo tallow is an excellent cocoa butter substitute, the properties of which are almost equal to those of cocoa butter. Palm kernel fat has a melting point in the neighbourhood of that of cocoa butter, but it contains a high percentage of esters of lauric acid, which are not present in cocoa butter. Moreover it has a low iodine value. The other fats at room temperature are oils containing some solid fat. The iodine value is high, for palm oil higher than 50, for the other fats higher than 60. In view of these properties, apart from Borneo tallow, only 1 to 2% of these fats can be added to cocoa butter if divergent properties are to be avoided.

Numerous attempts have afterwards been made to obtain a fat with better properties, which would admit of being added to cocoa butter in larger amounts. The principal methods for the preparation of these fats are:

(a) Partial hardening of oils, such as ground nut oil, coconut oil, whale oil.
(b) Elaidinization of fats, such as palm oil, with selenium, for instance, as catalyst.
(c) Interesterification of fats, which may or may not be followed by fractional crystallization from solvents.
(d) Fractional crystallization of fats from solvents.

By the methods mentioned sub (a), (b), and (c) the fats were modified in such a way that though they did sometimes have a melting point, iodine value, or saponification value that was approximately equal to that of cocoa butter, addition of increasing percentages to cocoa butter gave rise to a divergence from cocoa butter, increasing to a maximum, in the solidifying and melting characteristics. In view of this only small percentages of these fats could as yet be added if divergence in properties from cocoa butter was to be avoided.

Figure 1:
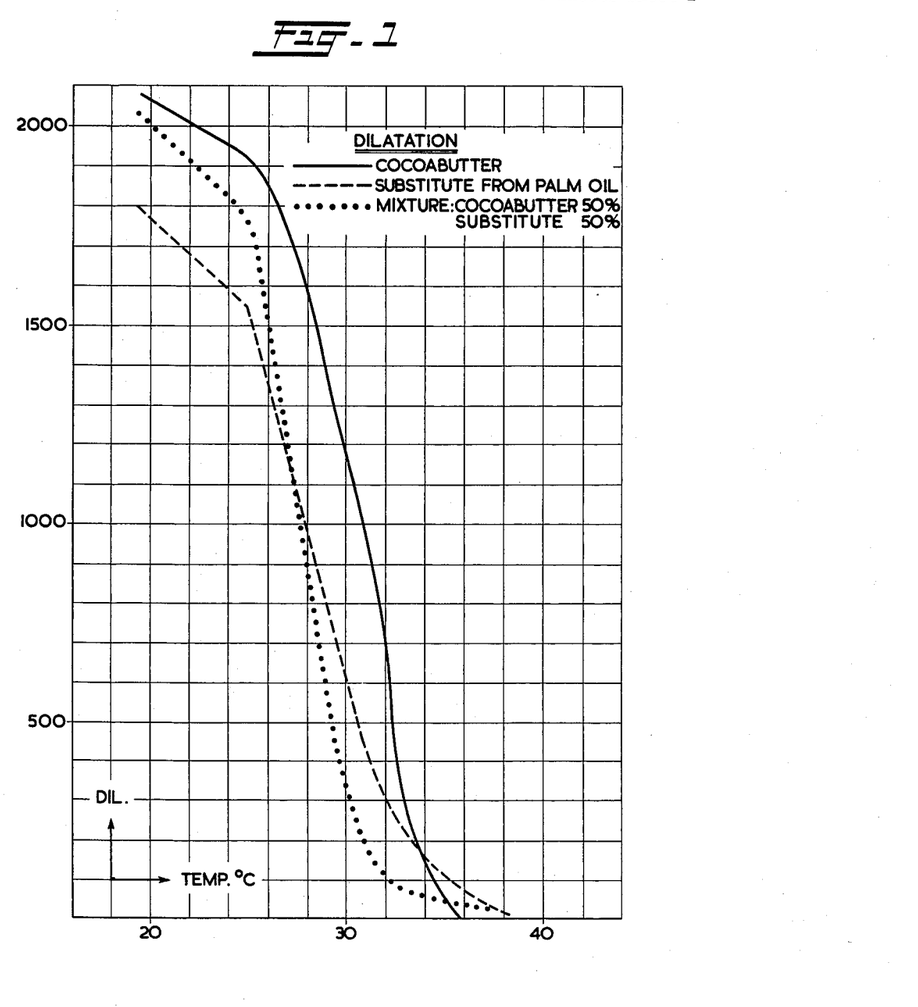
Figure 2:
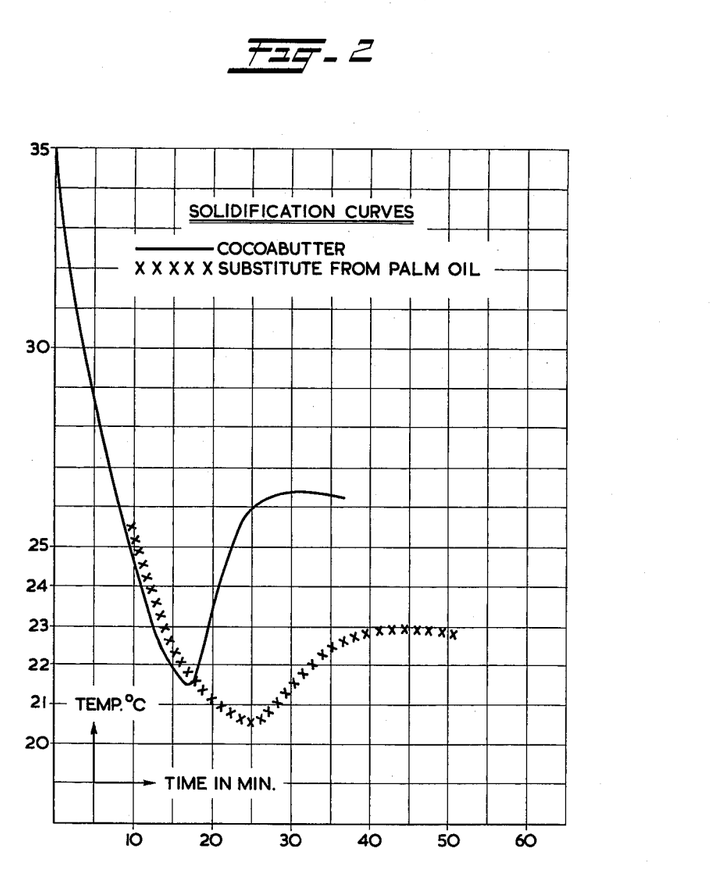

The cocoa butter substitute which is obtained from a vegetable fat such as palm oil by fractional crystallization, by the process described in German patent application DAS 1,030,668, consists as to more than 70% of dipalmito-oleo-triglycerides. This appears from the fatty acid analysis of this substitute, of which the percentage of palmitic acid is about 55 and the percentage of stearic acid about 7, as well as from the paper by T. P. Hilditch and L. Maddison in J. Soc. Chem. Ind. 59, 67–71 (1940), Table II on p. 68, where by fractional crystallization from palm oil the same product with the same iodine value is prepared as the one referred to as cocoa butter substitute in the above-mentioned German application. In this fractionation the palm oil fraction consists as to 60.1% of palmitic acid and as to 5.3% of stearic acid, while the percentage of dipalmito-oleo-triglycerides is about 80, as appears from Table III on p. 69. The fraction which here has to serve as cocoa butter substitute, however, at 20° C. has a lower dilatation than cocoa butter (i.e. is less hard), while the dilatations between 1500 and 500 are reached at a temperature 3° C. lower than with cocoa butter. Moreover the properties of the mixtures of the substitute with cocoa butter do not under all circumstances lie between those of the substitute and cocoa butter (FIG. 1). The solidification curves of cocoa butter and the substitute from palm oil are represented in FIG. 2.

In the preparation of a cocoa butter substitute from hog lard, according to German patent application DAS 1,030,159, from hog lard a mono-unsaturated glyceride fraction is obtained by fractional crystallization, which glyceride fraction has to serve as a cocoa butter substitute and, according to Table 89A on p. 320 of the book by T. P. Hilditch, The Chemical Constitution of Natural Fats, ed. 1949, consists as to more than 75% of stearyl-palmityl-oleyl triglycerides.

Cocoa butter too consists as to more than 50% of triglycerides of palmitic, stearic, and oleic acids (see p. 249 of the above-mentioned book by T. P. Hilditch), but the composition of these triglycerides is obviously different from that of the triglycerides which are obtained from hog lard, since with a mixture of the hog lard fraction with cocoa butter a very marked lowering of the dilatation curve is obtained, as appears from the following table:

| Samples of fat | Dilatations at— | | | | | |
|---|---|---|---|---|---|---|
| | 20° C. | 25° C. | 30° C. | 32° C. | 34° C. | 36° C. |
| hog lard fraction with iodine value 35.4 | 2,040 | 2,030 | 1,820 | 1,690 | 1,400 | 1,000 |
| mixture: 75% of cocoa butter, 25% of hog lard fraction | 1,680 | 1,250 | 330 | 100 | 20 | 0 |
| cocoa butter | 2,040 | 1,920 | 1,230 | 750 | 160 | 0 |

Thus, when the mono-unsaturated glyceride fraction from hog lard is mixed with cocoa butter, a considerable lowering of the melting point takes place, so that the arrangement of the fatty acids over the α and β positions in the hog lard fraction is different from that in cocoa butter, in view of which this fraction is not suitable to serve as a satisfactory cocoa butter substitute. In this connection reference may be made to the paper by D. Chapman c.s. in J. Chem. Soc. (1957), p. 1502, from which it appears that the palmityl-oleyl-stearyl glycerides in cocoa butter are β-oleyl triglycerides and those in hog lard are β-palmityl triglycerides.

Chocolate is usually made by adding sugar and cocoa butter (or a cocoa butter substituted) to cocoa mass containing about 50% of cocoa butter. Even if one were to make chocolate from cocoa powder having a low fat content, which contains about 10% of cocoa butter, and cocoa butter substitute alone, this would still contain a mixture of cocoa butter and substitute.

The changes in the properties of cocoa butter brought about by the addition of substitute are thus of primary importance for the appreciation of the quality of the substitute. An ideal cocoa butter substitute therefore will be fat whose properties (such as melting and solidifying characteristics, iodine value, saponification value) are equal to those of cocoa butter, while also any mixture of the substitute with cocoa butter will have properties which are also equal to those of cocoa butter.

Now the invention relates to the preparation of an ideal cocoa butter substitute in the above sense, i.e. a fat approaching cocoa butter in its composition, so that partial replacement of cocoa butter by substitute does not result in a mixture which is inferior in quality to pure cocoa butter. In order to define the term "equal to cocoa butter" more precisely, both as regards the dilatations at some temperatures and as regards the solidification points, a number of different types (10 to 20) of cocoa butter were examined.

For all types of cocoa butter, except Brazilian cocoa butter, the dilatation at 20° C. averaged 2075, at 25° C. 1960, and at 30° C. 1330. At 30° C. the standard deviation $\delta$ was 201, so that for a dilatation of 1000 at 30° C. the chance of this value being exceeded was found to be 0.95. For Brazilian cocoa butters the dilatation at 20° C. averaged 1730, at 25° C. 1555, and at 30° C. 850. The standard deviation at 30° C. $\delta$ was 96.0, so that a dilatation of 1000 at 30° C. gave a chance of 0.06 of this value being exceeded.

Since Brazilian cocoa butters owing to their lower melting point are in general less desirable, the limits of divergency to be regarded as "equal to cocoa butter" will be those of all cocoa butters with the exception of Brazilian cocoa butter, so that 95% of all cocoa butter at 30° C. has a dilatation exceeding 1000.

For the same group of cocoa butters the solidification point was found to average 26.3° C. with a standard deviation $\delta$ of 0.24. A solidification point of 25.9° C. therefore has a chance of 0.95 of this value being exceeded, so that 95% of all cocoa butter has a solidification point higher than 25.9° C.

The determination of the dilatation, which may be supposed to be generally known, took place according to the D. G. F. Einheitsmethoden C–IV 3e (1957), after standardized stabilization of the fats. The solidification curves were determined with the apparatus illustrated in FIG. 3 (scale 1:1). It consists of a jacket 1 cooled by water of 15° C., which encloses a solidification tube 3, filled with 15.0 g. of fat, which is invariably placed in the same way in the cooling jacket by means of a ground-glass joint. Between the solidification tube and the water jacket an air jacket 2 is present. Fitted in the axis of the tube is a thermometer the mercury bulb of which is in the centre of the column of fat. Revolving round it at a rate of 180 r.p.m. is the mechanical helical stirrer 4.

Figure 3:
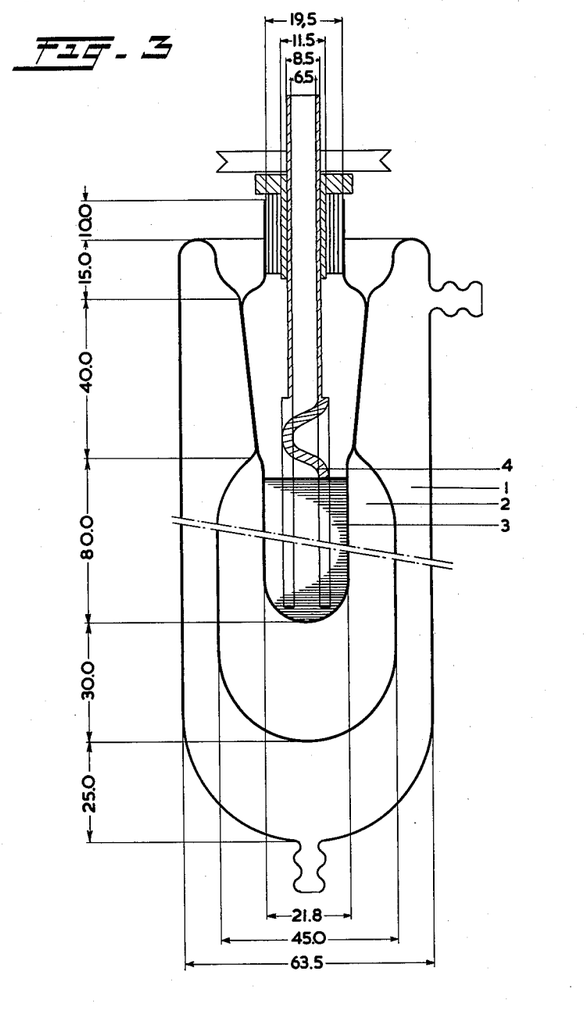

Observation is started when the temperature of the fat is exactly 35° C.; this is the commencing point of the determination. When upon cooling the lowest temperature has been reached, the stirring is stopped. The highest temperature which is reached in this way owing to the rise of temperature is referred to as the solidifying point.

According to the invention a cocoa butter substitute is prepared the triglyceride composition of which resembles the composition of cocoa butter so closely that the properties of the product are, as desired, entirely or almost entirely equal to those of cocoa butter and its mixture with the latter in any proportion is such that its properties lie, as desired, entirely or almost entirely between those of the substitute and those of cocoa butter; this is effected by separating from vegetable fats containing at least 10% of mono-unsaturated triglycerides, the saturated fatty acids of which are palmitic and/or stearic acid and the unsaturated fatty acid oleic acid, by fractionation with acetone, mono-unsaturated triglyceride fractions A, B, and D, and a fraction C mainly consisting of di-unsaturated triglycerides, and subsequently mixing 40–75% of fraction A, 0–30%, preferably 15–30% of fraction B, 0–15% of fraction C, and 0–25% of fraction D, fraction A being obtained from Mowrah fat, fractions B and C from Shea butter, Dumori butter, Njave or Baku butter, and fraction D from palm oil, Phulwara butter, or Kepayan oil, it being understood that the mono-unsaturated fractions A, B, and D are the residual fractions, which are obtained from the said initial fats by removing 50–75% of the weight as lowest-melting fraction by fractionation in one or several stages, for which a total quantity of 2–20 l. of acetone per kg. of fat is used at temperatures between 0 and 12° C., and subsequently removing the highest-melting fraction as insoluble fraction by fractionation at temperatures between 12 and 35° C. with 2–20 l. of acetone per kg. of fat, while the lowest-melting fraction from Shea butter, Dumori butter, Njave or Baku butter is fraction C.

The procedure may also consist in that two or more fats, from which the fractions A, B, C, and D can be obtained, are first mixed before being fractionated.

In the preparation of a cocoa butter substitute according to the present application a triglyceride fraction (fraction A) consisting as to more than 80% of palmityl-oleyl stearyl triglycerides is isolated from Mowrah fat; the fatty acid composition of this fraction is given in Table I.

In the fractionation of Shea butter a fraction which is solid at room temperature and an oil fraction are obtained, while the unsaponifiable portion is removed. The solid fat fraction consists as to more than 80% of di-stearyl-oleyl glycerides and as to about 10% of completely saturated triglycerides of palmitic and stearic acids (fraction B), and the oil fraction (fraction C) consists as to about 75% of stearyl dioleyl glyceride and as to about 17% of palmityl dioleyl glyceride and as to about 8% of trioleyl glyceride.

For the fatty acid compositions of these fractions, see Table I. The fat fraction which is isolated from palm oil (fraction D) has approximately the same composition as that which is obtained by T. P. Hilditch and L. Maddison (J. Soc. Chem. Ind. 59, 67–71 (1940), Tables II and III on pp. 68 and 69), and according to their statement consists as to 80% of dipalmityloleyl triglyceride. The fatty acid composition of this fraction is given in Table I.

*Table I*

[Fatty acid compositions of cocoa butter, and of the fat fractions A, B, C, and D in percentages]

| fatty acid | cocoa butter, percent | fat fr. A from e.g. Mowrah fat, percent | fat fr. B from e.g. Shea butter, percent | fat fr. C from e.g. Shea butter, percent | fat fr. D from e.g. palm oil, percent |
|---|---|---|---|---|---|
| Palmitic acid | 24 | 26 | 6 | 7 | 60 |
| Oleic acid+linoleic acid | 40 | 42 | 32 | 70 | 35 |
| Stearic acid | 36 | 32 | 62 | 23 | 5 |

In Table II the glyceride composition of the substitute prepared according to the invention is compared with the glyceride compositions of cocoa butter and the substitute from palm oil according to German patent application DAS 1,030,668 (compare the book by T. P. Hilditch, Table 69, p. 249).

Table II

[Glyceride compositions, in percentages, of the cocoa butter substitute according to the present invention, cocoa butter, and the substitute from palm oil]

| triglyceride | substitute according to present application | cocoa butter | substitute according to DAS 1,030,668 |
|---|---|---|---|
| palmityl-stearyl | 1-3 | 2 | 3 |
| distearyl-oleyl | 12-24 | 19 | |
| palmityl-oleyl-stearyl | 32-56 | 52 | 17 |
| dipalmityl-oleyl | 0-20 | 6 | 80 |
| stearyl-dioleyl | 0-12 | 12 | |
| palmityl-dioleyl | 0-3 | 9 | |

Figure 4:
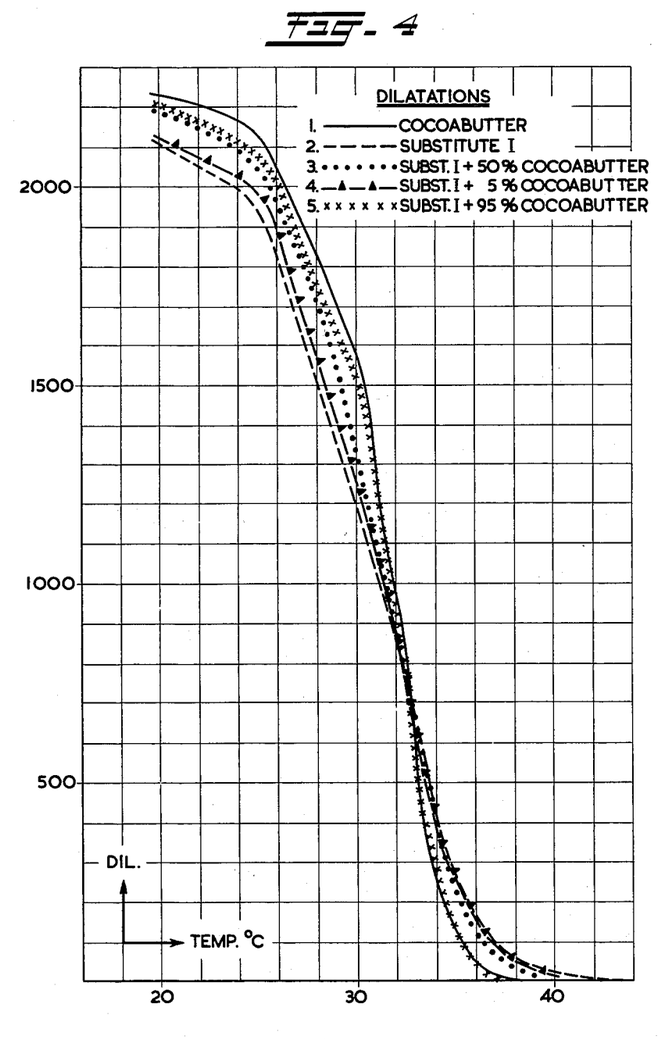

That the composition of the triglycerides of the substitute is identical with that of cocoa butter will be evident from the fact that according to the present invention a mixture of fats can be obtained which, as appears from FIG. 4, at different temperatures has the same dilatation values as cocoa butter and which, when mixed in any proportion with cocoa butter, gives mixtures the values of which lie between those of the substitute and those of cocoa butter.

Figure 5:
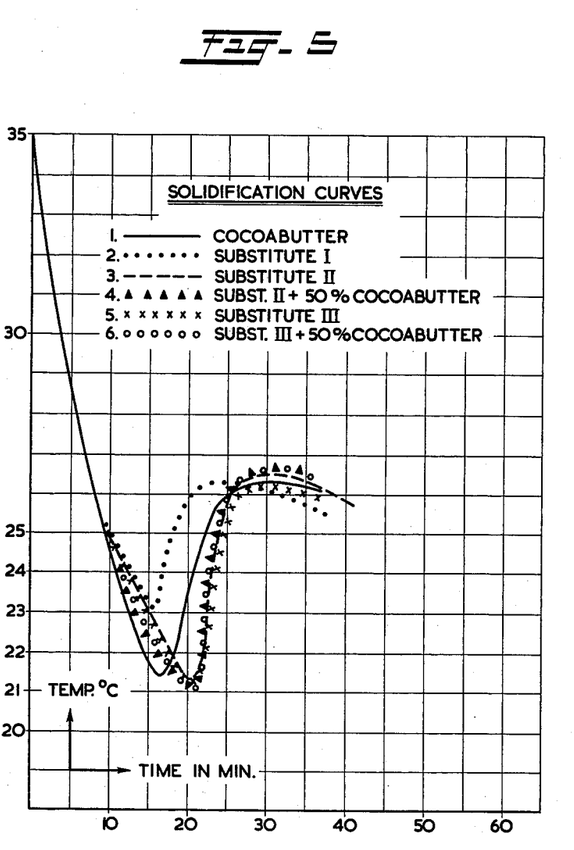

From FIG. 5 it appears that the solidification point of the substitute is equal to that of cocoa butter and that the solidification curve of a mixture of the substitute in any proportion with cocoa butter gives values lying between those of the fats constituting the mixture (substitute and cocoa butter).

From the above it is thus evident that the triglyceride composition of the cocoa butter substitute prepared by the above procedure differs in a marked degree from the conventional cocoa butter substitutes.

No substitute for cocoa butter having the aforesaid properties was known so far.

The fractionation is intended to separate the mono-unsaturated triglyceride fraction from the fats in as pure a state as possible, so that a minimum of di- and tri-unsaturated and completely saturated triglycerides is present in this fraction. Although by means of fractional crystallization it is also possible to obtain fractions which are suitable to be used as a cocoa butter substitute in the way described above, fractional extraction is preferred. The procedure for this is as follows: The fat in the presence or absence of acetone is brought into a solid or semi-solid, extractable condition and is subsequently extracted once or several times at the same or at increasing temperatures between 0 and 12° C. with a total quantity of acetone two to twenty times that of the fat, the extract containing the low-melting fraction of the fat (fraction 1) is removed or the latter fraction is recovered, if the initial material is Shea butter, Dumori butter, Njave or Baki butter, as fat fraction C, the residue of the extraction(s) is extracted once or several times at the same or at increasing temperatures between 12 and 35° C. with a total quantity of acetone two to twenty times that of the fat, and from this extract (these extracts) the fat fraction A, B, or D (fraction 2) is recovered by evaporation of the acetone, while the residue consists substantially of unsaponifiable constituents or of high-melting triglycerides (fraction 3).

It is advisable to proceed in such a way that the fat, after being brought into an extractable condition, is extracted in one or two stages at about 4° C. and at about 7° C. with 2 to 5 l. of acetone per kg. of fat. The removal of the unsaponifiable portion from the solid mono-unsaturated glyceride fractions A and B can be effected by dissolving these fractions in acetone and separating the solution from the undissolved, unsaponifiable fraction.

The separation into fractions is sharper in extraction than in crystallization, i.e. when the fat is separated into mono-unsaturated and di-unsaturated triglyceride fractions, for instance, these fractions can be obtained in a purer form by extraction than by srystallization. In fact, crystallization always involves supersaturation of the less soluble (higher-melting) fraction, which crystallizes at a given moment. In this crystallization at the same time a certain percentage of the better soluble (lower-melting) fraction is occluded in the crystal and thus gets into the precipitate. The extent of the supersaturation depends on the cooling rate, in the sense that the supersaturation is greater with rapid than with slow cooling.

In view of this, the cooling in fractional crystallization should always take place slowly. Since under the same circumstances the degree of supercooling is greater at one time than at another, fluctuations will occur in the yield and the properties of the substitute fraction.

The advantage of fractional extraction over fractional crystallization is that at a given temperature the lower-melting fraction dissolves much more rapidly in acetone than does the higher-melting fraction, in consequence of which the lower-melting glyceride fraction can be separated from the higher-melting fraction in a short time, while at the same time the latter fraction is obtained in a purer condition than in crystallization.

Furthermore the extraction process is much better suited for continuous operation than the crystallization process.

EXAMPLES FOR THE PREPARATION OF THE FRACTIONS A, B, C, AND D

1. Preparation of Component Fat A (a) 302.7 g. of deacidified Mowrah fat (crude Mowrah fat contained 12.3% of free fatty acids, iodine value 63.5) was dissolved in 450 ml. of practically dry acetone by heating to 35° C. The solution was cooled, while slowly stirring, at a rate of about 2° C. per 15 minutes to +2° C. As a result a large proportion of the fat crystallized. To the crystal mass there was now added 900 ml. of acetone of about 0° C., upon which the crystall mass was extracted for about 1 hour at 4° C. The crystal mass was next filtered with the aid of a Böchner funnel cooled to 4° C. The extract (filtrate) contained 124.7 g.=41.2% of oil with an iodine value of 73.8.

The crystal mass was subsequently extracted with 900 ml. of acetone by stirring the mass for 30 minutes at 7° C. The crystal mass was filtered off and then extracted again for 30 minutes at this temperature with 540 ml. of acetone. After filtration the two extracts were combined. The mixture contained 82.5 g.=27.3% of oil, with an iodine value of 69.5.

The crystal mass was then extracted for 90 minutes at 25° C. with 750 ml. of acetone. After filtration the extraction was repeated for 90 minutes at the same temperature with 250 ml. of acetone.

The two extracts (filtrates) were combined after filtration. The mixture contained 86.5 g.=28.6% of fat, with an iodine value of 38.8.

The solid fraction was extracted again for 30 minutes with 150 ml. of acetone at 30° C. After filtration the filtrate was found to contain 0.9 g.=0.3% of fat, with an iodine value of 24.5. After evaporation of the acetone the extraction residue was 3.5 g.=1.2%, with an iodine value of 123.9, and consisted of unsaponifiable constituents.

The fraction with an iodine value of 38.8, which was obtained in a yield of 28.6%, has to serve as component fat A.

(b) This fraction can also be obtained by fractional crystallization from acetone:

401.1 g. of deacidified Mowrah fat (containing in the crude state 12.3% of free fatty acid, iodine value 63.5) with 0.17% of free fatty acid was dissolved in 2.000 ml. of practically dry acetone.

The solution was cooled, while slowly stirring, at a rate of about 2° C. per 15 minutes to 0° C. As a result a portion of the fat crystallized. The crystal mass was filtered off with the aid of a cooled, double-walled Büchner funnel, and washed once again with a small quantity of cold acetone. The filtrate contained 188.6 g.=47% of oil, with an iodine value of 72.5–73.1.

The crystal fraction (244.8 g.) was dissolved in 2,200 ml. of acetone, while heating to 39° C. The solution was again crystallized, while slowly stirring, by cooling at a rate of 2 to 3° C. per 15 minutes to 7° C. The crystal mass was filtered off, a filtrate being thus obtained which contained 90.8 g.=22.6% of oil, with an iodine value of 62.9. After evaporation of the adhering acetone the crystal fraction was 110.1 g.=27.4%, with an iodine value of 38.0.

A second crystallization under approximately identical conditions yielded 124.6 g.=31.1% of this crystal fraction, with an iodine value of 40.2.

Melting point determination:

31.3° C. incipient melting
31.9° C. Vaselinelike consistency
32.8° C. molten, cloudy
36.8° C. molten, clear This latter fraction has to serve as component fat A.

II. Preparation of Component Fats B and C (a) 200.3 g. of refined Shea butter (iodine value 56.8, free fatty acids 0.18%) was dissolved in 300 ml. of acetone. The solution was subsequently cooled at a rate of about 3° C. per 15 minutes to 0° C.

The crystal mass was allowed to settle for 15 minutes, upon which the supernatant solution was siphoned off.

After this, 750 ml. of acetone of 0° C. was added and the solution was extracted at 2° C. After having been stirred for 30 minutes at this temperature, the crystal mass was allowed to settle for 10 minutes, upon which the clear extract was siphoned off.

At the same temperature the extraction was repeated once again with 450 ml. of cold acetone.

The three extracts were combined to: extraction to 2° C.

The following extractions, which were carried out in the same way, took place as described in the scheme below.

Extraction at 5° C.:

1° extraction with 650 ml. of acetone
2° extraction with 300 ml. of acetone

Extraction at 7° C.:

1° extraction with 500 ml. of acetone
2° extraction with 300 ml. of acetone

These extracts of 5 and 7° C. were combined to: extraction 2 to 7° C.

Extraction at 30° C.:

The crystals were extracted for 1 hour with 500 ml. of acetone and then filtered, i.e. extraction 7 to 30° C.

The solid substance filtered off was returned to the flask and extracted for 1 hour with 250 ml. of acetone at 50° C., upon which the filtration was repeated, i.e. extraction 30 to 50° C. The solid fraction, which had not yet dissolved at 50° C., was 2.9 g.=1.4%, with an iodine value of 315, and consisted of unsaponifiable constituents.

Upon distillation of the different extracts, fat fractions were obtained in quantities as shown in the table below:

Extraction to 2° C.___________ 112.3 g.=56.1%, iodine value 66.5.
Extraction 2 to 7° C.__________ 13.2 g.=6.6%, iodine value 55.7.
Extraction 7 to 30° C.________ 68.4 g.=34.1%, iodine value 31.0.
Extraction 30 to 50° C._______ 3.7 g.=1.8%, iodine value 26.1.
Insoluble fraction above 50° C_ 2.9 g.=1.4%.

The fat fraction from the extract of 7 to 30° C., with an iodine value of 31.0, which was obtained in a yield of 34.1%, has to serve as component fat B.

The combined fat fractions to 7° C., i.e. 62.7%, have to serve as component fat C.

(b) These fractions can also be obtained by crystallization:

253.1 g. of Shea butter was dissolved at 25° C. in 1,265 ml. of acetone. However, not all the buttter dissolved. The insoluble portion was filtered off and was rather viscous. Weight 4.2 g.=1.7%. It consisted of unsaponifiable constituents.

After heating to 30° C. the filtrate was still somewhat cloudy. The solution was cooled, while slowly stirring, at a rate of about 2° C. per 15 minutes to 0° C. After filtration, the acetonic solution was found to contain 125.1 g.=49.4% of oil, with an iodine value of 65.7.

The crystal fraction (121.8 g.) was dissolved in 1,000 ml. of acetone by heating to 37° C. This solution was subsequently cooled, while slowly stirring, at a rate of 3° C. per 15 minutes to 7° C., upon which the crystal mass was filtered.

The filtrate contained 25.7 g.=12.3% of oil, with an iodine value of 57.6. After evaporation of the acetone the crystal fraction was 75.0 g.=35.9%, with an iodine value of 32.0. This fraction also has to serve as component fat B, while the combined oil fractions of the crystallization at 0 and 7° C. have to serve as component fat C.

Melting point determination of component fat B:

37.5° C. incipient melting
39.5° C. Vaselinelike consistency
40.3° C. molten, clear

III. Preparation of Component Fat D (a) The component fat D can be prepared by extraction of palm oil with acetone. Palm oil of 35° C. was first slowly cooled, while stirring, to about 10° C., by which means a preliminary crystallization was obtained. Upon this, a thin layer of this viscous palm oil was applied on a smooth surface and cooled further to 0° C. The thin layer had now become fairly hard and could be removed with a knife, as a result of which flakes were obtained, which could be extracted as such.

65 g. of these flakes was extracted with acetone at 2, 5, and 7° C., while during the extractions slow stirring was applied. After each extraction the flakes and crystals were allowed to settle for 15 minutes, upon which the extract was siphoned off. The fractions were combined to an extract, from which after evaporation of the acetone 41 g. of oil (i.e. 63.1%) was obtained, with an iodine value of 64.6. The flakes were subsequently extracted at 22, 25, 28, and 30° C. From the combined extracts after evaporation of the acetone 18.8 g. of fat (i.e. 29.0%, calculated on the palm oil) was obtained, with an iodine value of 32.5, which fat has to serve as component fat D. After evaporation of the extracting agent the remainder of the crystals weighed 5.0 g.=7.7% and had an iodine value of 4.5.

(b) 300 g. of crude palm oil (iodine value 52.2, free fatty acids 4.4%) was dissolved in 1,500 ml. of acetone and heated to 43.5° C. This solution was cooled, while slowly stirring, at a rate of 2 to 3° C. per 15 minutes to 2° C. The crystals thus formed were filtered off.

The acetonic solution contained 138.2 g. of oil (46.1%), with an iodine value of 65.9. The crystal fraction was dissolved in 1,500 ml. of acetone and subsequently cooled, while slowly stirring, to 22° C. The solid substance which crystallized was filtered off. Weight 32.1 g.=10.7%, with an iodine value of 12.1. The acetonic solution contained 123.0 g.=41% of fat, with an iodine value of 43.1.

This fat fraction contains some solid fat, which is able to crystallize slowly at room temperature and has to serve as component fat D.

This fraction can also be crystallized once again, so that a fraction is obtained in a smaller yield, with a lower iodine value and a higher melting point, which may also serve as component fat D, such as a fraction with an iodine value of 34.2.

EXAMPLES OF COCOA BUTTER SUBSTITUTES, COMPOSED OF THE FATS A, B, C, AND D

EXAMPLE I

Composition of substitute I:

50% of component fat A
25% of component fat B
25% of component fat D

Properties: dilatation No. 2 (FIG. 4), solidification curve No. 2 (FIG. 5)
Mixture of substitute I with 50% of cocoa butter: dilatation No. 3 (FIG. 4)
Mixture of substitute I with 5% of cocoa butter: dilatation No. 4 (FIG. 4)
Mixture of substitute I with 95% of cocoa butter: dilatation No. 5 (FIG. 4)

EXAMPLE II

Figure 6:
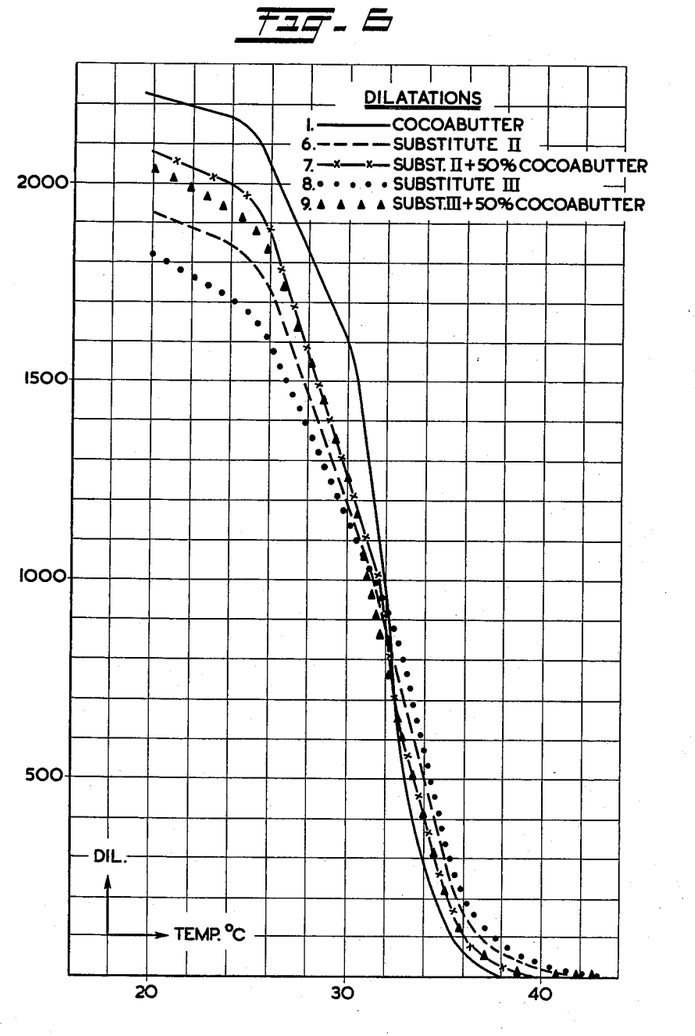

Composition of substitute II:

60% of component fat A
25% of component fat B
5% of component fat C
10% of component fat D Properties: dilatation No. 6 (FIG. 6), solidification curve No. 3 (FIG. 5)
Mixture of substitute II with 50% of cocoa butter: dilatation No. 7 (FIG. 6), solidification curve No. 4 (FIG. 5)

EXAMPLE III

Composition of substitute III:

60% of component fat A
25% of component fat B
15% of component fat C

Properties: dilatation No. 8 (FIG. 6), solidification curve No. 5 (FIG. 5)
Mixture of substitute III with 50% of cocoa butter: dilatation No. 9 (FIG. 6), solidification curve No. 6 (FIG. 5)

EXAMPLE IV

SUBSTITUTE IV

Preparation by fractionation of a mixture of Mowrah fat, Shea butter, and palm oil: A mixture of 83.3 g. of deacidified Mowrah fat, 39.1 g. of refined Shea butter, and 50.8 g. of palm oil was dissolved in 860 ml. of practically dry acetone. The solution, which was cloudy at 25° C., was filtered. The filtrate, which was still slightly cloudy, was cooled, while slowly stirring, at a rate of about 2° C. per 15 minutes to 2° C. The crystal mass was filtered. The filtrate contained 82.1 g.=47.4% of oil, with an iodine value of 68.1.

The crystal mass was dissolved in 630 ml. of acetone by heating to 45° C., upon which the solution was cooled, while slowly stirring, to 21.7° C. The crystal mass was kept at this temperature for one hour and subsequently filtered. After evaporation of the acetone the solid substance was 5.0 g.=2.9%, with an iodine value of 49.6. To the solution was added a further 220 ml. of acetone, and subsequently it was cooled, while slowly stirring, to 7° C. The mass was kept at this temperature for another 30 minutes and then filtered. The filtrate contained 28 g.=16.2% of oil, with an iodine value of 62.6. After evaporation of the acetone the crystal fraction was 54.6 g.=31.5%, with an iodine value of 37.3.

This fraction is the cocoa butter substitute IV in question.

Figure 7:
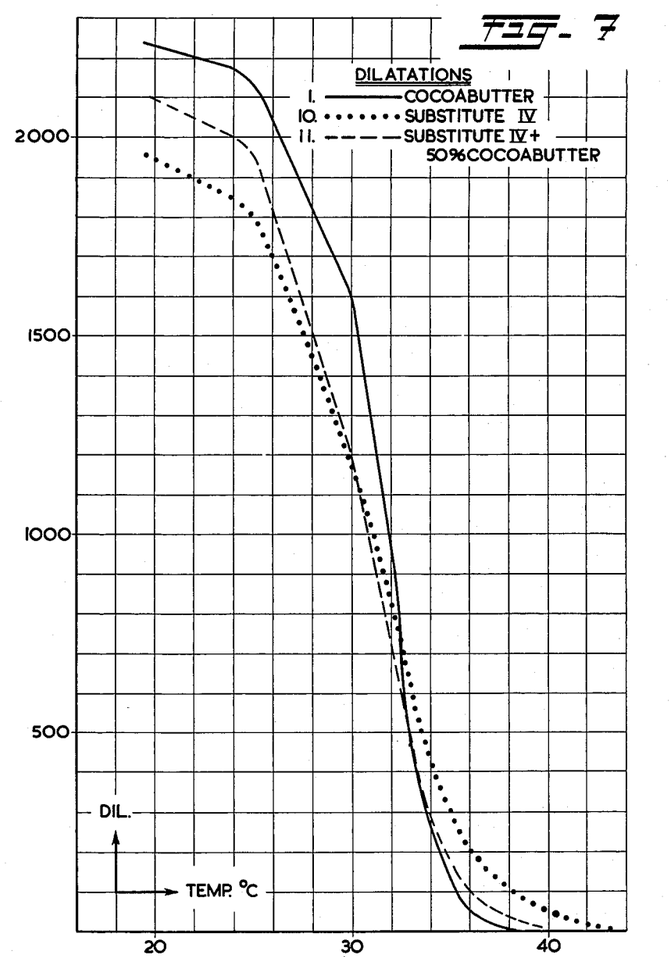
Figure 8:
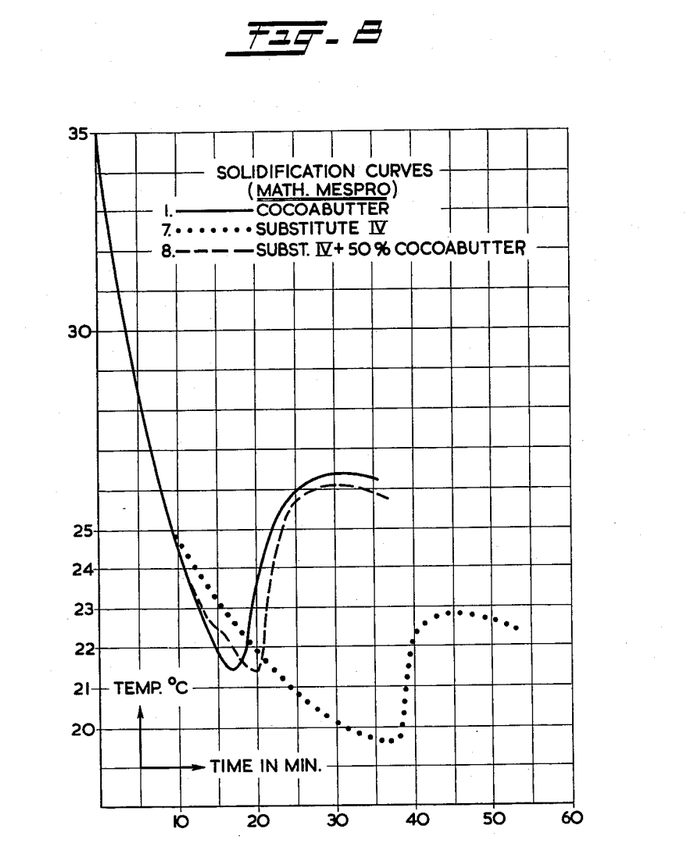

For the properties of substitute IV, see:

Dilatation No. 10 (FIG. 7)
Solidification curve No. 7 (FIG. 8)

Properties of a mixture of substitute I with 50% of cocoa butter:

Dilatation No. 11 (FIG. 7)
Solidification curve No. 8 (FIG. 8)

EXAMPLE V

Preparation of chocolate in which cocoa butter has been replaced as to nearly one half by a substitute.

Composition:
28 g. of cocoa powder (10% of fat)
20 g. of substitute fat
21 g. of cocoa butter
56 g. of powdered sugar Chocolate of this composition, which is prepared in the same way as chocolate in which exclusively cocoa butter has been incorporated, cannot be told apart as regards its properties (hardness, melting characteristics, formation of "bloom," etc.) from chocolate in which only cocoa butter has been incorporated.

What I claim is:

1. Cocoa butter substitute the properties of which are at least substantially equal to those of cocoa butter and which when mixed with cocoa butter in any proportion provides a mixture having properties which lie at least substantially between those of cocoa butter and those of said substitute, comprising, about 40 to about 75 percent of a mono-unsaturated triglyceride fraction (A) of Mowrah fat; and the remaining 25 to 60 percent of said substitute being comprised of 0 to 30 percent of mono-saturated triglyceride fraction (B) of, and 0 to 15 percent of a di-unsaturated triglyceride fraction (C) of, at least one fat from the class consisting of Shea butter, Dumori butter, Njave butter and Baku butter; and 0 to 25 percent of a mono-unsaturated triglyceride fraction (D) of at least one fat from the class consisting of palm oil, Kepayan oil and Phulwara butter; each of said percentages being based on the total weight of said substitute; each of said fractions being obtained by fractionation of its respective fat with about 2 to about 20 liters of acetone per kg. of said respective fat at a temperature between about 0 and about 12° C. to provide said di-unsaturated triglyceride fraction in solution and a residue, which residue is fractionated with about 2 to about 20 liters of acetone per kg. of said respective fat at a temperature in the approximate range of 12 to 35° C. to form an extract containing said mono-unsaturated triglyceride fraction.

2. Cocoa butter substitute as claimed in claim 1 wherein said substitute contains fractions (A), (B) and (D) as the only specified fractions.

3. Cocoa butter substitute as claimed in claim 1 wherein said substitute contains fractions (A), (B), (C) and (D).

4. Cocoa butter substitute as claimed in claim 1 wherein said substitute contains fractions (A), (B) and (C) as the only specified fractions.

5. Cocoa butter substitute as claimed in claim 1 wherein said fractions (B) and (C) are derived from Shea butter and said fraction (D) is derived from palm oil.

6. Cocoa butter substitute as claimed in claim 2 wherein said fraction (B) is derived from Shea butter and said fraction (D) is derived from palm oil.

7. Cocoa butter substitute as claimed in claim 3 wherein said fractions (B) and (C) are derived from Shea butter and said fraction (D) is derived from palm oil.

8. Cocoa butter substitute as claimed in claim 4 wherein said fractions (B) and (C) are derived from Shea butter.

9. A process for the preparation of cocoa butter substitute the properties of which are at least substantially equal to those of cocoa butter and which when mixed with cocoa butter in any proportion provides a mixture having properties which lie at least substantially between those of said substitute and those of cocoa butter, comprising the steps of separating low melting fractions (1) from Mowrah fat to provide a mono-unsaturated triglyceride fraction (A); (2) from at least one fat from the class consisting of Shea butter, Dumori butter, Njave butter and Baku butter to provide a di-unsaturated triglyceride fraction (C) as low melting fraction and a mono-unsaturated triglyceride fraction (B); and (3) from at least one fat from the class consisting of palm oil, Phulwara butter and Kepayan oil to provide a mono-unsaturated triglyceride fraction (D); by fractionating each of said fats with 2 to 20 liters of acetone per kg. of said fat at a temperature of about 0 to 12° C. to separate said low melting fraction as solution and said mono-unsaturated triglyceride fraction as residue and thereafter fractionating said residue with about 2 to about 20 liters of acetone per kg. of said fat at a temperature of about 12 to 35° C. to provide an extract containing said mono-unsaturated triglyceride fraction; and forming a mixture containing 40 to 75 weight percent of fraction (A), 0 to 30 weight percent of fraction (B), 0 to 15 weight percent of fraction (C) and 0 to 25 weight percent of fraction (D), said mixture representing said cocoa butter substitute.

10. A process as claimed in claim 9 wherein the fats of fractions (A), (B) and (D) are mixed, prior to fractionation in such quantities as to provide the specified proportions of said fractions (A), (B) and (D).

11. A process as claimed in claim 9 wherein the fats of fractions (A) and (D) are mixed prior to fractionation in such quantities as to provide the specified proportions of said fractions (A) and (D).

References Cited in the file of this patent

UNITED STATES PATENTS 2,903,363   Farr _________________ Sept. 8, 1959

FOREIGN PATENTS 217,590   Australia _______________ May 2, 1957
589,947   Canada ________________ Dec. 29, 1959

OTHER REFERENCES

"Industrial Oil and Fat Products," second edition, by Bailey, Interscience Publishers, Inc., New York, 1951, pages 138–142.

"Cocoa Butter-Like Fats From Domestic Oils," by Feuge et al., the Journal of the American Oil Chemists' Society, May 1958, vol. XXXV, No. 5, pages 194–199.